(12) United States Patent
Uchida

(10) Patent No.: US 9,945,558 B2
(45) Date of Patent: Apr. 17, 2018

(54) OXYFUEL COMBUSTION BOILER SYSTEM

(71) Applicant: IHI Corporation, Koto-ku (JP)

(72) Inventor: Terutoshi Uchida, Tokyo (JP)

(73) Assignee: IHI CORPORATION, Koto-ku (JP)

( * ) Notice: Subject to any disclaimer, the term of this patent is extended or adjusted under 35 U.S.C. 154(b) by 664 days.

(21) Appl. No.: 14/484,985

(22) Filed: Sep. 12, 2014

(65) Prior Publication Data

US 2014/0373762 A1   Dec. 25, 2014

Related U.S. Application Data

(63) Continuation of application No. PCT/JP2013/001631, filed on Mar. 13, 2013.

(30) Foreign Application Priority Data

Mar. 14, 2012   (JP) ................... 2012-056665

(51) Int. Cl.
*F23C 9/00*  (2006.01)
*F23L 15/04*  (2006.01)
(Continued)

(52) U.S. Cl.
CPC ................ *F23L 7/007* (2013.01); *F22B 1/22* (2013.01); *F23C 9/00* (2013.01); *F23C 9/08* (2013.01);
(Continued)

(58) Field of Classification Search
CPC . F23L 7/007; F23L 15/04; F23L 2900/07001; F23J 15/06; F22B 1/22;
(Continued)

(56) References Cited

U.S. PATENT DOCUMENTS 5,282,429 A   2/1994   Kato et al.
6,149,713 A   11/2000   Ochi et al.
(Continued)

FOREIGN PATENT DOCUMENTS

EP   1 959 193 A1   8/2008
EP   1959193 A1 *  8/2008
(Continued)

OTHER PUBLICATIONS

Extended European Search Report dated Sep. 24, 2015 in Patent Application No. 13761218.0.
(Continued)

*Primary Examiner* — Alissa Tompkins
*Assistant Examiner* — Benjamin W Johnson
(74) *Attorney, Agent, or Firm* — Oblon, McClelland, Maier & Neustadt, L.L.P.

(57) ABSTRACT

A combined heat exchanger including a flue gas cooler heat-transfer unit supplied with cooling fluid by a supply pump and an upstream GGH heat-transfer unit for circulation of circulating fluid with a downstream GGH by a circulation pump is arranged at an outlet of a gas air heater for heat exchange of flue gas from a boiler body for oxyfuel combustion with recirculation flue gases. A low-low temperature ESP is arranged at an outlet of the combined heat exchanger. A heat-exchange-duty adjustment device is arranged to regulate heats exchanged in the heat-transfer units in the heat exchanger such that at least flue gas temperature at the inlet of the low-low temperature ESP is kept to an inlet set temperature.

2 Claims, 4 Drawing Sheets

(51) Int. Cl.

| | | |
|---|---|---|
| | *F23L 7/00* | (2006.01) |
| | *F23C 9/08* | (2006.01) |
| | *F23N 3/00* | (2006.01) |
| | *F23N 3/06* | (2006.01) |
| | *F23N 1/08* | (2006.01) |
| | *F23J 15/06* | (2006.01) |
| | *F22B 1/22* | (2006.01) |

(52) U.S. Cl.
 CPC .............. *F23J 15/06* (2013.01); *F23L 15/04* (2013.01); *F23N 1/082* (2013.01); *F23N 3/002* (2013.01); *F23N 3/06* (2013.01); *F23J 2217/102* (2013.01); *F23L 2900/07001* (2013.01); *F23N 2025/10* (2013.01); *Y02E 20/322* (2013.01); *Y02E 20/344* (2013.01); *Y02E 20/348* (2013.01)

(58) Field of Classification Search
 CPC .... F23C 9/00; F23C 9/08; F23N 1/082; F23N 3/06; F23N 3/002; Y02E 20/322; Y02E 20/344; Y02E 20/348
 USPC ............ 122/432, 441, 479.2, 420, 421, 422
 See application file for complete search history.

(56) References Cited

U.S. PATENT DOCUMENTS

| | | | |
|---|---|---|---|
| 2009/0272300 | A1 | 11/2009 | Yamada et al. |
| 2011/0132243 | A1* | 6/2011 | Terushita .............. F22B 35/002 110/345 |

FOREIGN PATENT DOCUMENTS

| | | | |
|---|---|---|---|
| JP | 63-217103 | A | 9/1988 |
| JP | 7-56377 | B2 | 6/1995 |
| JP | 09-318005 | A | 12/1997 |
| JP | 11-179147 | A | 7/1999 |
| JP | 2001-248826 | A | 9/2001 |
| JP | 2002-370012 | A | 12/2002 |
| JP | 2002370012 | * | 12/2002 |
| JP | 2004-154683 | A | 6/2004 |
| JP | 2007-326079 | A | 12/2007 |
| JP | 2011-141075 | A | 7/2011 |
| JP | 2011-190940 | A | 9/2011 |

OTHER PUBLICATIONS

International Search Report dated Jun. 4, 2013 for PCT/JP2013/001631 Filed Mar. 13, 2013 (English Language).

\* cited by examiner

OXYFUEL COMBUSTION BOILER SYSTEM

TECHNICAL FIELD

The present invention relates to an oxyfuel combustion boiler system.

BACKGROUND ART

Nearly all conventional boilers generally in practical use are air combustion boilers which are disclosed, for example, in Patent Literatures 1 and 2.

The air combustion boilers have a problem of lowered heat efficiency because of sensible heat loss owing to a nitrogen component in the air. Thus, oxygen-enriched combustion has been studied as a measure for enhanced heat efficiency in the combustion. The oxygen-enriched combustion, which has a nitrogen component reduced relative to that in the air combustion, is known to have lowered sensible heat loss and thus enhanced heat efficiency.

Meanwhile, in a boiler or the like, pure oxyfuel combustion and a combination thereof with flue gas recirculation have been recently suggested (see, for example, Patent Literature 3). Attention has been paid to such oxyfuel combustion as an effective way since, if employed, nearly all flue gas may be changed into carbon dioxide ($CO_2$) which may be captured using a simplified separator.

CITATION LIST

Patent Literature

[Patent Literature 1] JP 2007-326079A
[Patent Literature 2] JPH 09-318005A
[Patent Literature 3] JP 2011-141075A

SUMMARY OF INVENTION

Technical Problems

In a boiler, strict regulations on soot dust emission concentration in flue gas discharged from the boiler have to be cleared. To this end, arranged downstream of the boiler is a combination of a dry electrostatic precipitator (referred to as dry ESP), a soot separation type desulfurizer with a soot dust removal tower and upstream and downstream gas-gas heat exchangers (referred to as upstream and downstream GGHs) for prevention of sulfate corrosion and of white smoke, a wet electrostatic precipitator (referred to as wet ESP) being added to the combination, thereby attaining a predetermined soot dust removal performance.

However, such measure is disadvantageous in that a construction for soot dust removal from flue gas is complicated, leading to increase in installation and running costs for a flue gas treatment plant.

Thus, a flue gas treatment plant has been recently suggested which comprises a heat recovery unit arranged at an outlet of a gas air heater (referred to as GAH) to lower a temperature of flue gas to anywhere from 85° C. to 90° C. and a dry electrostatic precipitator (referred to as low-low temperature ESP) arranged at an outlet of the heat recovery unit and exhibiting a high soot dust removal effect in the flue gas with the temperature anywhere from 85° C. to 90° C. The low-low temperature ESP can lower an electric resistivity of ash, resolve a back corona phenomenon and enhance the soot dust removal performance. According to such flue gas treatment plant with the low-low temperature ESP, a soot dust removal tower and a wet ESP may be rendered unnecessary so that a boiler system can be obtained which has compactness and economic potential unattainable in the conventional technology.

Meanwhile, flue gas recirculation has been suggested in an oxyfuel combustion boiler system comprising a gas air heater at an outlet of a boiler body such that part of downstream flue gas from which soot dust has been removed is extracted as recirculation flue gas, is preheated by the gas air heater and is guided to the boiler body. However, when the above-mentioned low-low temperature ESP is to be arranged at the outlet of the gas air heater, the temperature of the flue gas will be increased by the oxyfuel combustion, so that in addition to the heat recovery unit, an extra flue gas cooler is to be arranged for heat recovery so as to cool the flue gas to be guided to the low-low temperature ESP into a temperature suitable for soot dust removal.

However, to arrange the flue gas cooler in addition to the heat recovery unit disadvantageously complicates the construction of the flue gas treatment plant and increases an installation space required.

The invention was made in view of the above to provide an oxyfuel combustion boiler system which simplifies a flue gas treatment plant in the oxyfuel combustion boiler and reduces an installation space required.

Solution to Problems

The invention is directed to an oxyfuel combustion boiler system comprising
a combined heat exchanger arranged at an outlet of a gas air heater for heat exchange of flue gas from an boiler body for oxyfuel combustion with recirculation flue gas, said combined heat exchanger having therein a flue gas cooler heat-transfer unit supplied with cooling fluid by a supply pump as well as an upstream GGH heat-transfer unit for circulation of circulating fluid with a downstream GGH by a circulation pump,
a low-low temperature ESP arranged at an outlet of said combined heat exchanger, and
a heat-exchange-duty adjustment device for adjusting heat exchange duties in said flue gas cooler and upstream GGH heat-transfer units to keep at least a temperature of the flue gas at an inlet of the low-low temperature ESP to an inlet set temperature.

In the oxyfuel combustion boiler system, it is preferable that said heat-exchange-duty adjustment device comprises
first and second inner vanes for independently regulating flow rates of the flue gas compartmentedly flowing to said flue gas cooler and upstream GGH heat-transfer units,
a cooling-fluid bypass valve for bypassing said flue gas cooler heat-transfer unit to return cooling fluid back to downstream,
a circulating-fluid bypass valve for bypassing said upstream GGH heat-transfer unit to return circulating fluid back to the downstream GGH,
an inlet thermometer for detecting a temperature of the flue gas at an inlet of said low-low temperature ESP,
an outlet thermometer for detecting a temperature of the flue gas at an outlet of said downstream GGH,
a vane opening-degree controller for independently controlling opening degrees of said first and second inner vanes,
an inlet temperature controller for controlling opening degrees of said cooling-fluid and circulating-fluid bypass valves such that a detected temperature of the inlet thermometer at the inlet of said low-low temperature ESP is made equal to an inlet set temperature, an outlet temperature controller for controlling an opening degree of said second inner vane through said vane opening-degree controller such that a detected temperature of the outlet thermometer at the outlet of said downstream GGH is made equal to an outlet set temperature, and an operational controller for command-controlling said vane opening-degree controller and said inlet and outlet temperature controllers depending on an operational condition.

In the oxyfuel combustion boiler system, it is preferable that said vane opening-degree controller is adapted to control the first inner vane for said flue gas cooler heat-transfer unit to full close and the second inner vane for said upstream GGH heat-transfer unit to full open during air combustion at startup of the oxyfuel combustion boiler system, is adapted to control the first inner vane from full close via gradually increased opening degree to full open and the second inner vane from full open via gradually decreased opening degree to a minimum opening degree during switching between air and oxyfuel combustions and is adapted to control the first inner vane to full open and the second inner vane to a controlled opening degree during oxyfuel combustion;

said inlet temperature controller is adapted to control the opening degree of said circulating-fluid bypass valve such that the detected temperature of the inlet thermometer at the inlet of said low-low temperature ESP is made equal to the inlet set temperature during said air combustion with an amount of the cooling fluid to the flue gas cooler heat-transfer unit being regulated to a minimum flow rate using said cooling-fluid bypass valve and with an amount of the circulating fluid to the upstream GGH heat-transfer unit being regulated to a rated flow rate using said circulating-fluid bypass valve, is adapted to control the opening degree of said circulating-fluid bypass valve in a step before an intermediate point of a switch process of said first and second inner vanes as a switch point such that the detected temperature of the inlet thermometer at the inlet of said low-low temperature ESP is made equal to the inlet set temperature during said switching with the amounts of the cooling and circulating fluids to the flue gas cooler and upstream GGH heat-transfer units being preliminarily regulated to rated flow rates using the cooling-fluid and circulating-fluid bypass valves, respectively, and is adapted to control the opening degree of said cooling-fluid bypass valve such that the detected temperature of the inlet thermometer at the inlet of said low-low temperature ESP is made equal to the inlet set temperature in a step after the intermediate point of the switch process during said switching and during said oxyfuel combustion; and said outlet temperature controller is adapted to control the opening degree of the second inner vane through said vane opening-degree controller such that the detected temperature of the outlet thermometer is made equal to the outlet set temperature during said oxyfuel combustion.

Advantageous Effects of Invention

The invention, which has a low-low temperature ESP disposed at an outlet of a gas air heater via a combined heat exchanger having therein upstream GGH and flue gas cooler heat-transfer units, can have excellent effects that a flue gas treatment plant is simplified in structure and an installation space required is reduced.

DESCRIPTION OF EMBODIMENT

Next, an embodiment of the invention will be described in conjunction with the drawings.

Figure 1:
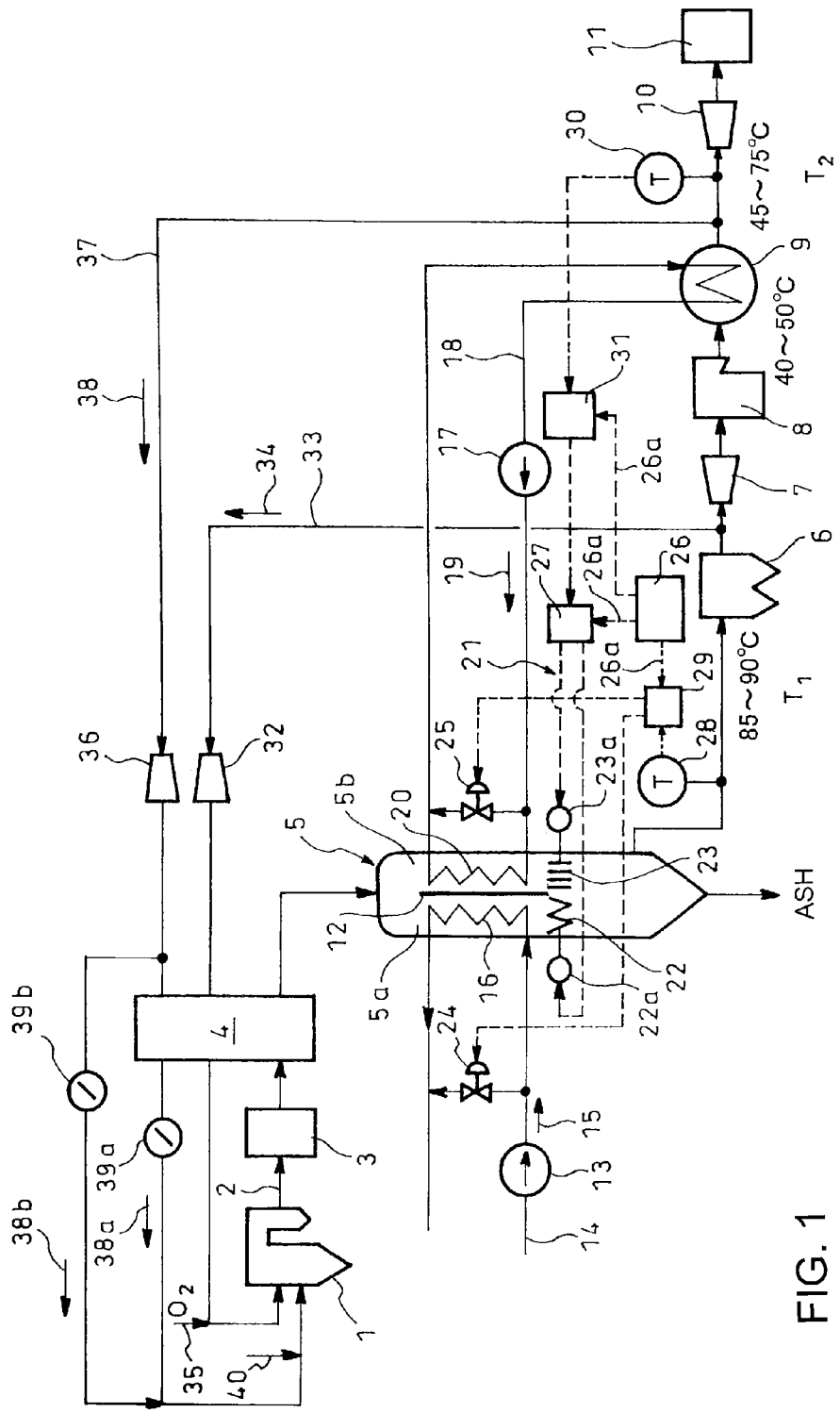
FIG. 1 is a block diagram showing an embodiment of an oxyfuel combustion boiler system according to the invention.

FIG. 1 shows an embodiment of an oxyfuel combustion boiler system according to the invention in which reference numeral 1 denotes a boiler body for oxyfuel combustion. Arranged at an outlet of the boiler body 1 through a denitrator 3 for denitration of flue gas 2 is a gas air heater 4 which heat-exchanges the flue gas 2 with recirculation flue gas to be referred to hereinafter, thereby preheating the recirculation flue gas.

Arranged at an outlet of the gas air heater 4 through a combined heat exchanger 5 is a dry electrostatic precipitator or low-low temperature ESP 6. Arranged at an outlet of the low-low temperature ESP 6 through an induced draft fan 7 is a desulfurizer 8. Arranged at an outlet of the desulfurizer 8 is a downstream GGH 9. Arranged at an outlet of the downstream GGH 9 through a booster fan 10 is a carbon dioxide capture unit 11.

The combined heat exchanger 5 has therein a compartment wall 12 for compartmented flow of the flue gas 2 into left and right chambers 5a and 5b. Arranged in one 5a of the chambers compartmented by the compartment wall 12 is a flue gas cooler heat-transfer unit 16 supplied with cooling fluid 15 (low-pressure supply water) by a supply passage 14 having a supply pump 13. Arranged in the other chamber 5b compartmented by the compartment wall 12 is an upstream GGH heat-transfer unit 20 connected to a the downstream GGH 9 by a circulation passage 18 having a circulation pump 17 for circulated supply of circulating fluid 19 (circulating water).

The combined heat exchanger 5 is provided with a heat-exchange-duty adjustment device 21 constructed as follows.

First and second inner vanes 22 and 23 are arranged at outlets of the one and the other chambers 5a and 5b and are regulatable in opening degree by first and second drives 22a and 23a, respectively.

Arranged between upstream and downstream sides of the supply passage 14 connected to the flue gas cooler heat-transfer unit 16 is a cooling-fluid bypass valve 24. Arranged between upstream and downstream sides of the circulation passage 18 connected to the upstream GGH heat-transfer unit 20 is a circulating-fluid bypass valve 25.

The first and second inner vanes 22 and 23 are adapted to be independently regulated by signals transmitted to the drives 22a and 23a from a vane opening-degree controller 27 which in turn is operated by a command 26a from an operational controller 26 depending on an operational condition (air combustion, switch between air and oxyfuel combustions and oxyfuel combustion).

Arranged at an inlet of the low-low temperature ESP 6 is an inlet thermometer 28, a temperature detected by the thermometer 28 being inputted to an inlet temperature controller 29. The inlet temperature controller 29 is operated by the command 26a from the operational controller 26 depending on the operational condition to regulate the opening degrees of the bypass valves 24 and 25 such that the detected temperature of the inlet thermometer 28 at the inlet of the low-low temperature ESP 6 is made equal to an inlet set temperature $T_1$ (in FIG. 1, any temperature within a range of 85-90° C.)

Arranged at an outlet of the downstream GGH 9 is an outlet thermometer 30, a temperature detected by the outlet thermometer 30 being inputted to an outlet temperature controller 31. The outlet temperature controller 31 is operated by the command 26a from the operational controller 26 depending on the operational condition to regulate the opening degree of the second inner vane 23 such that the detected temperature of the outlet thermometer 30 at the outlet of the downstream GGH 9 is made equal to an outlet set temperature $T_2$ (in FIG. 1, any temperature within a range of 45-75° C.). When the signal from the outlet temperature controller 31 is inputted, the vane opening-degree controller 27 cuts off the command 26a from the operational controller 26 on the operational condition, and regulates the opening degree of the second inner vane 23 on the basis of the signal from the outlet temperature controller 31.

In the embodiment shown in FIG. 1, for simplification, the description is made on a case where the supply and circulation pumps 13 and 17 are driven at a uniform rate of rotation. However, in addition to the operation of the heat-exchange-duty adjustment device 21, the flow rates of the cooling and circulating fluids 15 and 19 by the supply and circulation pumps 15 and 17, respectively, may be concurrently regulated.

In the oxyfuel combustion boiler system shown in FIG. 1, part of the flue gas from which soot dust has been removed by the low-low temperature ESP 6 at the outlet thereof is extracted as secondary recirculation flue gas 34 by a secondary recirculation line 33 with a secondary booster fan 32. The secondary recirculation flue gas 34 is guided to and preheated by the gas air heater 4, and is mixed with oxygen ($O_2$) 35 and supplied to the boiler body 1.

Part of the flue gas at the outlet of the downstream GGH 9 is extracted as primary recirculation flue gas 38 by a primary recirculation line 37 with a primary booster fan 36. Then, the primary recirculation flue gas 38 is divaricated into two; one of them is supplied to the gas air heater 4 where it undergoes heat exchange into preheated flue gas 38a. The other of the primary recirculation flue gas 38 bypasses the gas air heater 4 and is mixed, as it remains low-temperature flue gas 38b, with the preheated flue gas 38a through the dampers 39a and 39b and the like into temperature-regulated primary recirculation gas. The temperature-regulated primary recirculation gas is guided to, for example, a pulverized coal mill (not shown) to be accompanied by pulverized coal 40 and then is supplied to the boiler body 1. Illustrated in FIG. 1 is a case where part of the flue gas at the outlet of the low-low temperature ESP 6 is extracted as secondary recirculation flue gas 34 and part of the flue gas at the outlet of the downstream GGH 9 is extracted as primary recirculation flue gas 38; however, secondary and primary recirculation flue gas 34 and 38 may be extracted anywhere downstream of the low-low temperature ESP 6.

As mentioned in the above, the combined heat exchanger 5 is constituted to have therein the flue gas cooler and upstream GGH heat-transfer units 16 and 20, so that a construction between the gas air heater 4 and the low-low temperature ESP 6 can be simplified, leading to reduction of the installation space required.

Further, the vane opening-degree controller 27 regulates the opening degrees of the first and second inner vanes 22 and 23 depending on the operation condition from the operational controller 26, and the inlet temperature controller 29 regulates the opening degrees of the bypass valves 24 and 25 such that the detected temperature of the inlet thermometer 28 at the inlet of the low-low temperature ESP 6 is made equal to the inlet set temperature $T_1$. As a result, the flue gas regulated to 85-90° C. suitable for soot dust removal is supplied to the low-low temperature ESP 6, whereby high soot dust removal performance is exhibited.

On the other hand, the flue gas supplied from the low-low temperature ESP 6 to the wet type desulfurizer 8 is cooled to, for example, anywhere from 40-50° C. The flue gas at the outlet of the desulfurizer 8 may contain sulfuric acid mist so that, if the flue gas is discharged downstream as it is, it may disadvantageously bring about sulfate corrosion of downstream pipings and equipment.

Thus, depending on the operational condition from the operational controller 26, the outlet temperature controller 31 controls the opening degree of the second inner vane 23 via the vane opening-degree controller 27 such that the detected temperature of the outlet thermometer 30 at the outlet of the downstream GGH 9 is made equal to the outlet set temperature $T_2$. As a result, the flue gas temperature at the outlet of the downstream GGH 9 is regulated to anywhere from 45-75° C., so that the downstream equipment is prevented from being corroded by sulfuric acid mist in the flue gas. Here, it has been known to be effective that the temperature of the flue gas at the outlet of the desulfurizer 8 is enhanced by the temperature of 5-25° C. by the downstream GGH 9. Since excessively enhanced flue gas temperature by the downstream GGH 9 would increase recovery load by way of cooling in the downstream carbon dioxide capture unit 11, it is preferable that to obtain the flue gas temperature in the rage of 45-75° C. by the temperature increase of 5-25° C.

Next, with reference to FIGS. 2-4, the oxyfuel combustion boiler system will be described.

Figure 2:
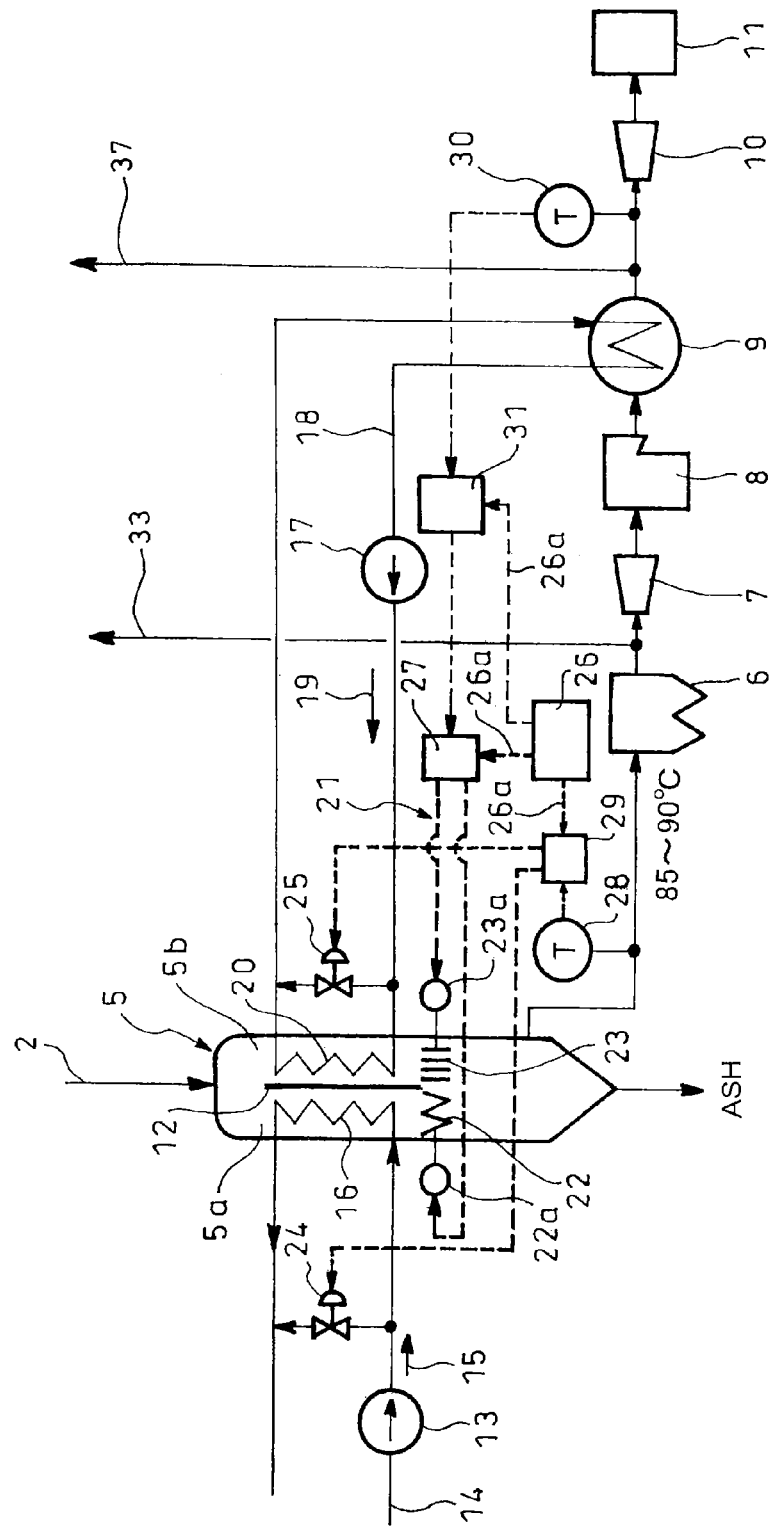
FIG. 2 is a block diagram showing an operation during air combustion in the oxyfuel combustion boiler system according to the invention.

FIG. 2 shows flue gas temperature control during the air combustion at the startup of the oxyfuel combustion boiler system. The boiler body, which is cold at the startup of the oxyfuel combustion boiler system, is heated by the air combustion of oil or gas.

<Air Combustion>

For the air combustion of the fuel in the boiler body 1 in FIG. 1, no recirculation of the secondary and primary recirculation flue gases 34 and 38 is conducted. The air is taken in by air-intakes upstream of the secondary and primary booster fans 32 and 36 and is boosted in pressure by secondary and primary booster fans 32 and 36, respectively, and is heated by the gas air heater 4 and supplied to the boiler body 1. For the air combustion, as shown in FIG. 2, the vane opening-degree controller 27 receives the command 26a on the operation condition (air combustion) from the operational controller 26 to control the first inner vane 22 for the flue gas cooler heat-transfer unit 16 to full close and the second inner vane 23 for the upstream GGH heat-transfer unit 20 to full open.

The inlet temperature controller 29 receives the command 26a on operation condition (air combustion) from the operational controller 26 to controls—with an amount of cooling fluid 15 to the flue gas cooler heat-transfer unit 16 being regulated to a minimum flow rate using the cooling-fluid bypass valve 24 and with an amount of the circulating fluid 19 to the upstream GGH heat-transfer unit 20 being regulated to a rated flow rate using the circulating-fluid bypass valve 25—the opening degree of the circulating-fluid bypass valve 25 such that the detected temperature of the inlet thermometer 28 at the inlet of the low-low temperature ESP 6 is made equal to the inlet set temperature $T_1$. In this case, a temperature at the outlet of the downstream GGH 9 remains as it is and is not controlled; only effected is the above-mentioned control for keeping the inlet temperature of the low-low temperature ESP 6 to the inlet set temperature $T_1$.

<Switch Between Air and Oxyfuel Combustions>

Figure 3:
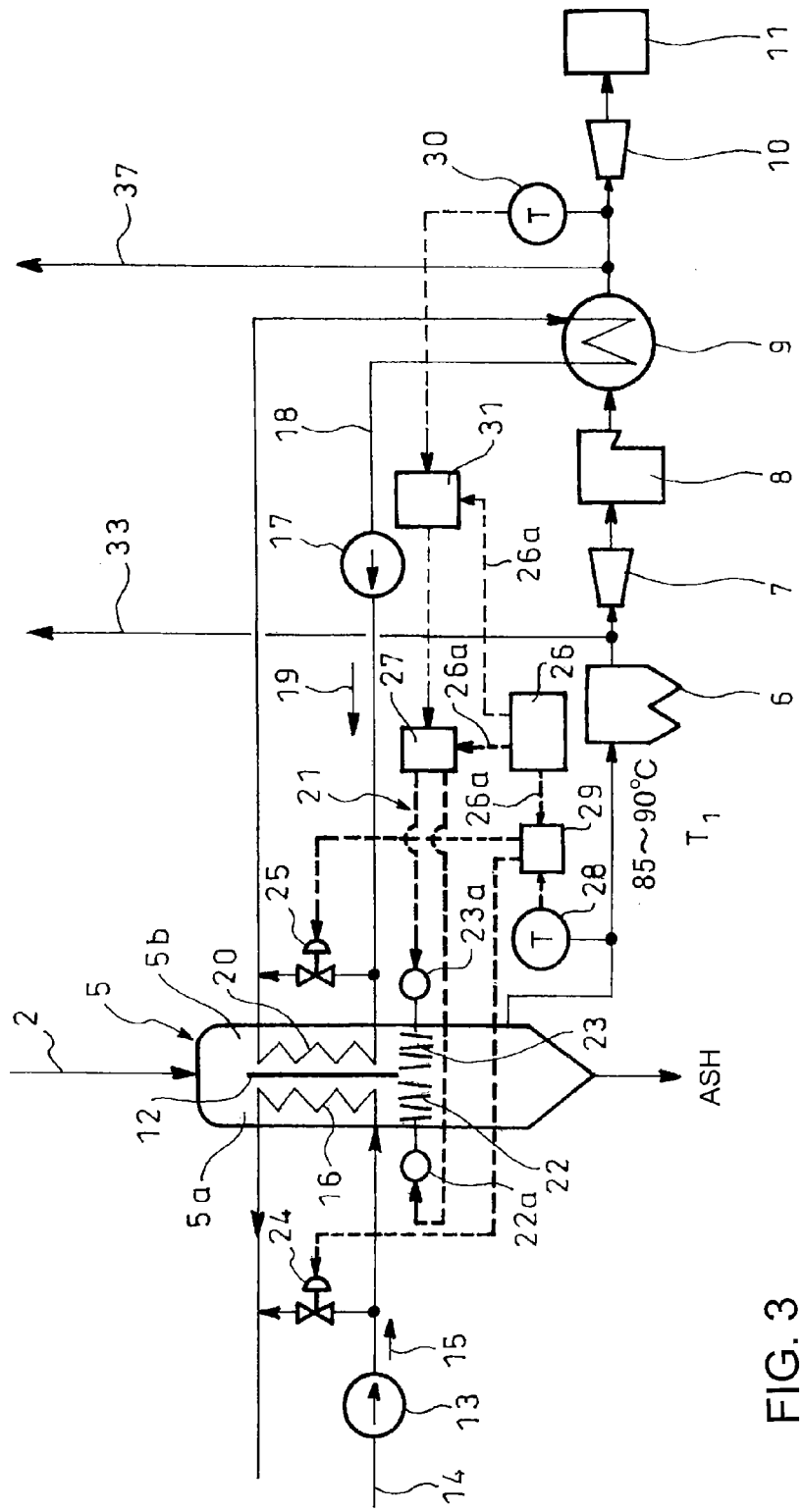
FIG. 3 is a block diagram showing an operation during switching between air and oxyfuel combustions in the oxyfuel combustion boiler system according to the invention.

For the switch of the air and oxyfuel combustions shown in FIG. 3, the vane opening-degree controller 27 receives the command 26a on the operational condition (switch) from the operational controller 26 to control the first inner vane 22 for the flue gas cooler heat-transfer unit 16 from full close via gradually increased opening degree to full open, and the second inner vane 23 for the upstream GGH heat-transfer unit 20 from full open via gradually decreased opening degree to a minimum opening degree.

The inlet temperature controller 29 receives the command 26a on the operational condition (switch) from the operational controller 26 to control—with the amounts of the cooling and circulating fluids 15 and 19 to the heat-transfer units 16 and 20 being initially regulated to rated flow rates by the bypass valves 24 and 25, respectively—the opening degree of the circulating-fluid bypass valve 25 in a step before an intermediate point during switch process of the first and second inner vanes 22 and 23 (for example, the opening degrees of the first and second inner vanes 22 and 23 being 50%, respectively) as switch point such that the detected temperature of the inlet thermometer 28 at the inlet of the low-low temperature ESP 6 is made equal to the inlet set temperature $T_1$, and control the opening degree of the cooling-fluid bypass valve 24 at a step after the switch point during the switching such that the detected temperature of the inlet thermometer 28 at the inlet of the low-low temperature ESP 6 is made equal to the inlet set temperature $T_1$. In this case, the temperature at the outlet of the downstream GGH 9 remains as it is and is not controlled; and only effected is the above-mentioned control for keeping the inlet temperature of the low-low temperature ESP 6 to the inlet set temperature $T_1$.

<Oxyfuel Combustion>

Figure 4:
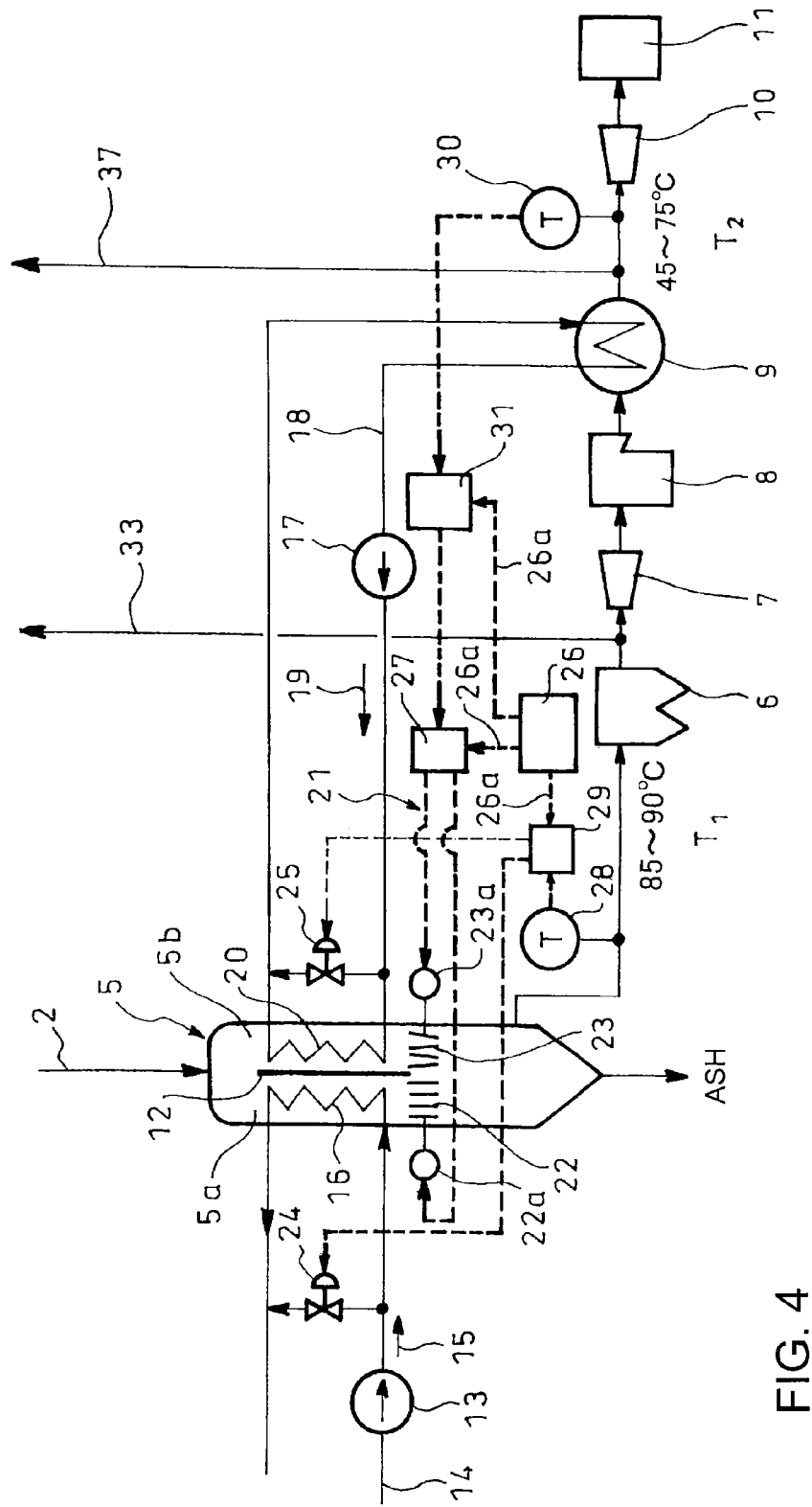
FIG. 4 is a block diagram showing an operation during oxyfuel combustion in the oxyfuel combustion boiler system according to the invention.

For the oxyfuel combustion shown in FIG. 4, the vane opening-degree controller 27 receives the command 26a of the operational condition (oxyfuel combustion) from the operational controller 26 to control the first inner vane 22 for the flue gas cooler heat-transfer unit 16 to full open and the second inner vane 23 for the upstream GGH heat-transfer unit 20 to a controlled opening degree.

The inlet temperature controller 29 receives the command 26a on the operational condition (oxyfuel combustion) from the operational controller 26 to control the opening degree of the cooling-fluid bypass valve 24 such that the detected temperature of the inlet thermometer 28 at the inlet of the low-low temperature ESP 6 is made equal to the inlet set temperature $T_1$. Moreover, the outlet temperature controller 31 receives the command 26a on the operational condition (oxyfuel combustion) from the operational controller 26 to control the opening degree of the second inner vane 23 for the upstream GGH heat-transfer unit 20 via the vane opening-degree controller 27 such that the detected temperature of the outlet thermometer 30 at the outlet of the downstream GGH 9 is made equal to the outlet set temperature $T_2$.

Thus, during the oxyfuel combustion, the flue gas temperature at the inlet of the low-low temperature ESP 6 is kept to the inlet set temperature $T_1$ (for example, 85-90° C.) to thereby ensure high soot dust removal performance by the low-low temperature ESP 6, and the flue gas temperature at the outlet of the downstream GGH 9 is kept to the outlet set temperature $T_2$ (45-75° C.) to thereby prevent the downstream equipment from undergoing sulfate corrosion.

It is to be understood that an oxyfuel combustion boiler system according to the invention is not limited to the above embodiment and that various changes and modifications may be made without departing from the scope of the invention.

INDUSTRIAL APPLICABILITY

An oxyfuel combustion boiler system according to the invention may be extensively used for a boiler or other oxyfuel combustion installation.

REFERENCE SIGNS LIST 1 boiler body
2 flue gas
4 gas air heater
5 combined heat exchanger
6 low-low temperature ESP
9 downstream GGH
12 compartment wall
13 supply pump
15 cooling fluid
16 flue gas cooler heat-transfer unit
17 circulation pump
19 circulating fluid
20 upstream GGH heat-transfer unit
21 heat-exchange-duty adjustment device
22 first inner vane
23 second inner vane
24 cooling-fluid bypass valve
25 circulating-fluid bypass valve
26 operational controller
26a command
27 vane opening-degree controller
28 inlet thermometer
29 inlet temperature controller
30 outlet thermometer
31 outlet temperature controller
34 secondary recirculation flue gas (recirculation flue gas)
38 primary recirculation flue gas (recirculation flue gas)
$T_1$ inlet set temperature
$T_2$ outlet set temperature

The invention claimed is:

1. An oxyfuel combustion boiler system comprising:
a boiler body for oxyfuel combustion,
a gas air heater for heating recirculation flue gas with flue gas from said boiler body during oxyfuel combustion,
a combined heat exchanger arranged at an outlet of said gas air heater,
a low-low temperature electrostatic precipitator arranged at an outlet of said combined heat exchanger,
a downstream gas-gas heat exchanger arranged downstream of said low-low temperature electrostatic precipitator,
a compartment wall arranged in said combined heat exchanger to provide first and second chambers,
a flue gas cooler heat-transfer unit arranged in said first chamber in said combined heat exchanger,
an upstream gas-gas heat exchanger heat-transfer unit arranged in said second chamber in said combined heat exchanger, a supply pump which supplies cooling fluid to said flue gas cooler heat-transfer unit, a circulation pump which circulates circulating fluid between said downstream gas-gas heat exchanger and said upstream gas-gas heat exchanger heat-transfer unit, and a heat-exchange-duty adjustment device which adjusts heat exchange duties in said flue gas cooler heat-transfer unit and said upstream gas-gas heat exchanger heat-transfer unit to keep at least a temperature of flue gas at an inlet of the low-low temperature electrostatic precipitator at an inlet set temperature, wherein said heat-exchange-duty adjustment device comprises:

first and second inner vanes which independently regulate flow rates of flue gas flowing to said flue gas cooler heat-transfer unit and said upstream gas-gas heat-exchanger heat-transfer unit, respectively, a cooling-fluid bypass valve that enables the cooling fluid to bypass said flue gas cooler heat-transfer unit, a circulating-fluid bypass valve that enables the circulating fluid to bypass said upstream gas-gas heat exchanger heat transfer unit and return to the downstream gas-gas heat exchanger, an inlet thermometer which detects a temperature of flue gas at an inlet of said low-low temperature electrostatic precipitator, an outlet thermometer which detects a temperature of flue gas at an outlet of said downstream gas-gas heat exchanger, a vane opening-degree controller which independently controls opening degrees of said first and second inner vanes, an inlet temperature controller which controls opening degrees of said cooling-fluid and circulating-fluid bypass valves to adjust a temperature of the flue gas at the inlet of said low-low temperature electrostatic precipitator detected by the inlet thermometer and make the temperature of the flue gas at the inlet of said low-low temperature electrostatic precipitator equal to the inlet set temperature, an outlet temperature controller which controls the opening degree of said second inner vane via said vane opening-degree controller to adjust a temperature of flue gas at the outlet of said downstream gas-gas heat exchanger detected by the outlet thermometer and make the temperature of the flue gas at the outlet of said downstream gas-gas heat exchanger equal to an outlet set temperature, and an operational controller which command-controls said vane opening-degree controller and said inlet and outlet temperature controllers depending on an operational condition.

2. The oxyfuel combustion boiler system as claimed in claim 1, wherein said vane opening-degree controller is adapted to:

control the first inner vane to a fully closed position and control the second inner vane to a fully opened position during air combustion at startup of the oxyfuel combustion boiler system, control the first inner vane from the fully closed position, by gradually increasing its opening degree, to a fully opened position and control the second inner vane from the fully opened position, by gradually decreasing its opening degree, to a minimum opening degree during switching between air and oxyfuel combustions, and control the first inner vane to the fully opened position and control the second inner vane to a predetermined opening degree during oxyfuel combustion;

wherein said inlet temperature controller is adapted to:

control the opening degree of said circulating-fluid bypass valve such that the temperature at the inlet of said low-low temperature electrostatic precipitator detected by the inlet thermometer is made equal to the inlet set temperature during said air combustion, wherein an amount of the cooling fluid flowing to the flue gas cooler heat-transfer unit is regulated to a minimum flow rate using said cooling-fluid bypass valve and wherein an amount of the circulating fluid flowing to the upstream gas-gas heat exchanger heat-transfer unit is regulated to a predetermined flow rate using said circulating-fluid bypass valve, control the opening degree of said circulating-fluid bypass valve in a step before an intermediate point of a switch process of said first and second inner vanes such that the temperature of the flue gas at the inlet of said low-low temperature electrostatic precipitator detected by the inlet thermometer is made equal to the inlet set temperature during said switch process, wherein amounts of the cooling and circulating fluids flowing to the flue gas cooler heat-transfer unit and the upstream gas-gas heat exchanger heat-transfer unit, respectively, are preliminarily regulated to predetermined flow rates using the cooling-fluid and circulating-fluid bypass valves, respectively, and control the opening degree of said cooling-fluid bypass valve such that the temperature of the flue gas at the inlet of said low-low temperature electrostatic precipitator detected by the inlet thermometer is made equal to the inlet set temperature in a step after the intermediate point of the switch process during said switch process and during said oxyfuel combustion; and wherein said outlet temperature controller is adapted to control the opening degree of the second inner vane via said vane opening-degree controller such that the temperature of the flue gas detected by the outlet thermometer at the outlet of said downstream gas-gas heat exchanger is made equal to the outlet set temperature during said oxyfuel combustion.

* * * * *